US011128701B1

(12) United States Patent
Virtuoso et al.

(10) Patent No.: US 11,128,701 B1
(45) Date of Patent: Sep. 21, 2021

(54) COOPERATIVE PREEMPTION IN A DISTRIBUTED MULTI-TENANT RESOURCE POOL

(71) Applicant: Amazon Technologies, Inc., Seattle, WA (US)

(72) Inventors: Anthony A. Virtuoso, Hawthorne, NJ (US); Andrew Shapira, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 16/367,685

(22) Filed: Mar. 28, 2019

(51) Int. Cl.
*H04L 29/08* (2006.01)
(52) U.S. Cl.
CPC ...... *H04L 67/1031* (2013.01); *H04L 67/1008* (2013.01); *H04L 67/1029* (2013.01)
(58) Field of Classification Search
None
See application file for complete search history.

(56) References Cited

U.S. PATENT DOCUMENTS

| | | | |
|---|---|---|---|
| 7,971,015 B2 * | 6/2011 | Waldspurger | G06F 11/1482 711/162 |
| 10,338,953 B2 * | 7/2019 | Ashbaugh | G06F 9/38 |
| 10,379,956 B2 * | 8/2019 | Gandhi | G06F 11/1484 |
| 11,007,051 B2 * | 5/2021 | Van Heugten | A61F 2/1624 |
| 2005/0192937 A1 * | 9/2005 | Barsness | G06F 16/24542 |
| 2011/0093852 A1 * | 4/2011 | Li | G06F 9/5066 718/100 |
| 2013/0291073 A1 * | 10/2013 | Dec | G06F 21/41 726/5 |
| 2015/0237137 A1 * | 8/2015 | Dageville | G06F 16/128 709/213 |
| 2017/0249215 A1 * | 8/2017 | Gandhi | G06F 11/1425 |
| 2018/0095795 A1 * | 4/2018 | Hebert | G06F 9/4881 |
| 2018/0157561 A1 * | 6/2018 | Venkatesh | G06F 8/65 |
| 2019/0190776 A1 * | 6/2019 | Bregman | G06F 9/5072 |
| 2020/0159587 A1 * | 5/2020 | Li | G06F 9/4881 |
| 2021/0027645 A1 * | 1/2021 | Nicol | G09B 7/00 |

* cited by examiner

*Primary Examiner* — Dhairya A Patel
(74) *Attorney, Agent, or Firm* — NDWE LLP

(57) ABSTRACT

Techniques for cooperative preemption of resources in a distributed multi-tenant resource pool are described. A query execution service manages the allocation of computing resources in a provider network by identifying computing nodes in the provider network to preempt. The service causes the computing nodes to be removed from further executing tasks as part of processing their queries in a first group of nodes in the provider network while other computing nodes in the first group continue to execute tasks as part of processing the queries. The service then adds the first computing node into a second group of nodes in the provider network to execute tasks as part of processing other queries in the provider network.

20 Claims, 9 Drawing Sheets

COOPERATIVE PREEMPTION IN A DISTRIBUTED MULTI-TENANT RESOURCE POOL

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Resource allocation plays an important role in the management and sharing of computing resources by multiple users in a public data center (also referred to herein as "service provider networks", or just "provider networks"). For example, provider networks must have the ability to efficiently share computing resources to service multiple requests from multiple clients accessing data at the same time.

BRIEF DESCRIPTION OF DRAWINGS

Various embodiments in accordance with the present disclosure will be described with reference to the drawings, in which.

DETAILED DESCRIPTION

Figure 1:
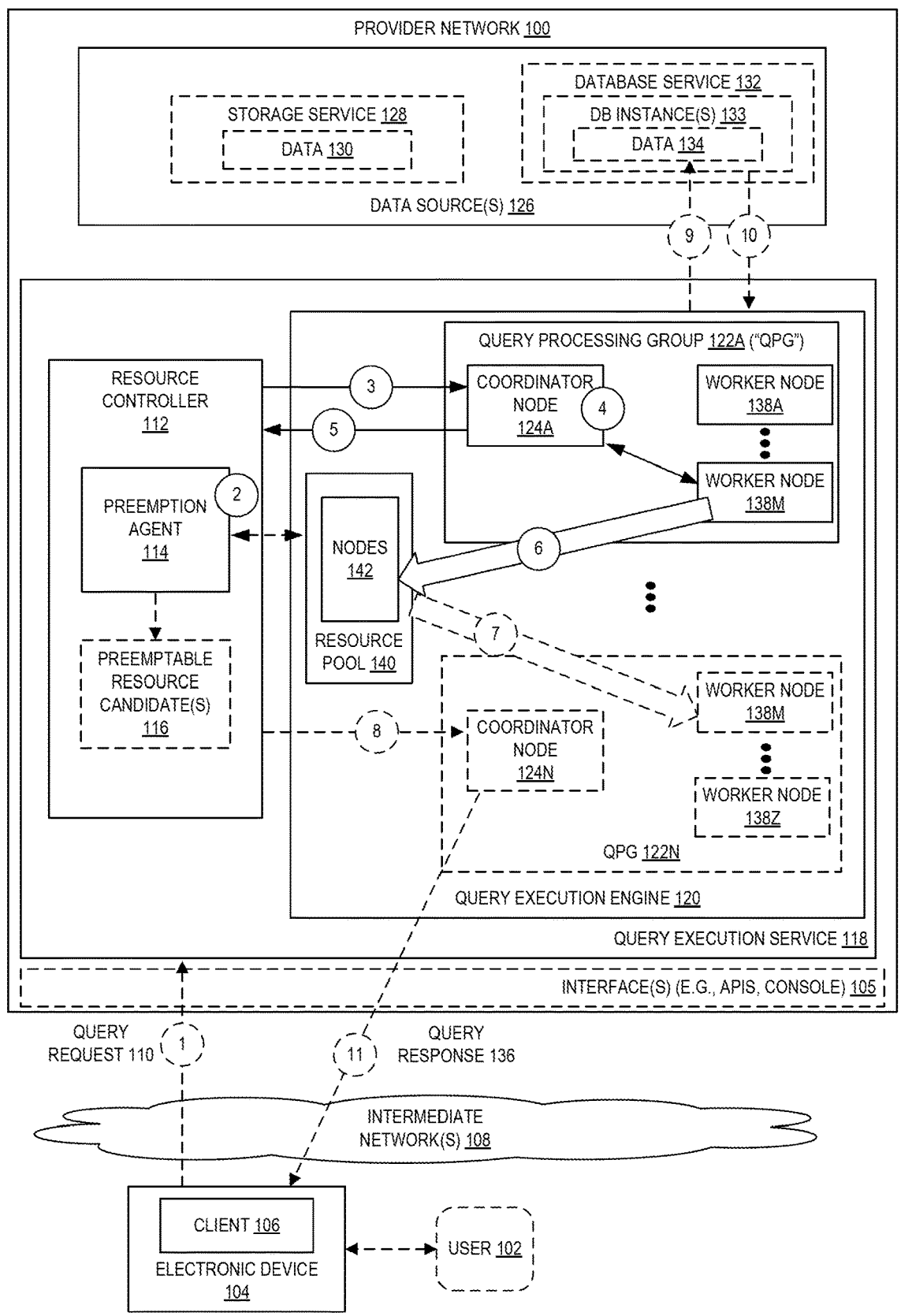
FIG. 1 is a diagram illustrating an environment including a query execution service in accordance with an embodiment of the present disclosure.

Various embodiments for cooperative preemption of resources in a distributed multi-tenant resource pool are described. According to some embodiments, a query execution service is disclosed that can execute user-provided queries against data stored by (or accessible to) a provider network. The query execution service could be or utilize, for example, a traditional relational database management system (e.g., MySQL, MariaDB, PostgreSQL, H2, Microsoft SQL Server, Oracle, etc.), a NoSQL database, an object database management system, an object-relational database system, a data warehouse system (e.g., Amazon Redshift), a "serverless" interactive query service (e.g., Amazon Athena), a distributed "Big Data" processing system (e.g., Apache Spark), etc. Many of these query services can be queried using a query written in one or more query languages (as defined by a query language definition), such as one or more of the many dialects, extensions, and implementations of Structured Query Language (SQL), such as Transact-SQL (T-SQL), Procedural Language/SQL (PL/SQL), PL/pgSQL (Procedural Language/PostgreSQL), SQL-86, SQL-92, SQL:2016, etc.

In some embodiments, the query execution service manages the allocation of computing resources for queries executing in one or more computing nodes in the provider network. As described herein, a computing resource (or "resource") may refer to Central Processing Unit (CPU) resources, memory resources, storage units, data resources (e.g., object storage, block-level storage, data archival storage, databases and database tables, etc.), application resources, or combinations of these resources, such as a computing node. A computing node may refer to a virtual machine (VM), a container, or other type of computing instance hosted by the provider network to perform a variety of computing tasks. Accordingly, a computing node may be referred to as including or utilizing a collection of computing resources to perform its tasks which may include, for instance, executing user-provided queries against data stored by to the provider network, e.g., by a database service, query execution service, etc.

Provider network operators may make conservative resource allocation decisions to react to sudden changes in demand and capacity for particular services within a provider network. Sudden changes in resource demand can, in some situations, be addressed by the addition of new computing resources to perform certain tasks without regard to the underlying resource capacity of the provider network. However, adding new resources to a task can take a non-insignificant amount of time (e.g., a few minutes or more) and may not be the most cost-effective way of dealing with resource fairness under different circumstances. In some situations, provider network operators may make resource allocation decisions by predicting future demand and/or future supply of computing resources within the provider network and allocate resources based on a predicted demand of resources.

For example, consider a scenario in which approximately half (e.g., 50%) of the underlying resource capacity of an exemplary query execution service offered in a provider network is unused. As one example, the query execution service may utilize a "pool" of compute instances for executing queries that includes 1,000 VMs, and at a point in time 500 of these VMs may be available for use. A query "Q1" may then arrive at time T1, and a particular amount of resources may be assigned for its execution. In this scenario, in addition to assigning some typical amount of resources for executing the query (e.g., a group of five VMs), it might be beneficial to assign some or all of the available resource capacity (e.g., all five hundred available VMs) to assist in processing query "Q1" (i.e., more than its allocated or typically allocated share of resources) so that it can be executed faster, and hence, provide a better response time to the customer. Additionally, this also could free up the resources currently being used by query "Q1" faster.

However, this may not be ideal in a situation when, for example, at time T2, a burst of queries arrive from other customers. In this situation, these queries might have to be queued until query "Q1" completes its execution and those resources used for query "Q1" are once again available for use by others. In this example, query "Q1" is executing faster than normal because it has more than its fair share of resources within the provider network, while the other queries sit idly by. To address such a situation, one approach would be to immediately terminate the execution of query "Q1" to get back the resource capacity utilized by the query, which can then be distributed among the multiple queries in some manner. However, this would negatively impact the customer running query "Q1" (due to its termination) and result in potentially wasted resource capacity for the partial work performed by the query.

According to some embodiments, the disclosed query execution service addresses these and other issues by identifying computing nodes in a provider network that can be preempted—or "taken back" from a query processing task—to be made available for other purposes, such as executing other queries when there is a sudden spike in requests or because of a previous overallocation of resources within the provider network. The preemption of computing nodes by the query execution service may thus balance the distribution of resources during times of low resource capacity while ensuring fairness in allocating resources across customers within the provider network.

FIG. 1 is a diagram illustrating an environment including a query execution service 118 in accordance with an embodiment of the present disclosure. In FIG. 1, the query execution service 118 is shown as part of a provider network 100, though in other embodiments the query execution service 118 may be implemented outside of a provider network 100, such as within a private or "on premise" network environment of an organization.

A provider network 100 provides users with the ability to utilize one or more of a variety of types of computing-related resources such as compute resources (e.g., executing VM instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 128 that can store data objects, etc. The users (or "customers") of provider networks 100 may utilize one or more user accounts that are associated with a customer account, though these terms may be used somewhat interchangeably depending upon the context of use. Users 102 may interact with a provider network 100 across one or more intermediate networks 108 (e.g., the internet) via one or more interface(s) 105, such as through use of application programming interface (API) calls, via a console implemented as a website or application, etc. The interface(s) 105 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

The provider network 100 may provide a query execution service 118 that can execute user-provided queries against data stored by (or accessible to) to the provider network, e.g., within a storage service 128, database service 132, etc. As will be described in more detail, the query execution service 118 manages the allocation of computing resources for queries to be executed by one or more computing nodes in the provider network. In certain embodiments, the query execution service 118 comprises one or more components such as a resource controller 112 and a query execution engine 120. These components may be implemented using one or more multiple computing devices located at one or more multiple locations.

The query execution engine 120 may be implemented using software executed by one or more query processing groups (QPGs) (e.g., 122A, 122N) in a localized or distributed manner. As described herein, each of the QPGs 122A-122N may comprise multiple computing nodes (or computing instances) executed by one or multiple computing devices located at one or multiple locations. For example, when the query execution service 118 is implemented within the provider network 100, the query execution engine 120 may be implemented in a distributed fashion using the QPGs in potentially many different geographic locations. As noted above, a computing node may refer to a VM, a container, or other computing instance hosted by the provider network that comprises or utilizes a collection of computing resources such as Central Processing Unit (CPU) resources, memory resources, storage units, data resources (e.g., object storage, block-level storage, data archival storage, databases and database tables, etc.), application resources, etc., for executing queries in the provider network 100. While FIG. 1 shows two QPGs (122A, 122N) comprising computing nodes (124A, 138A-138M) and (124N, 138M-138Z) respectively, in other embodiments, the query execution engine 120 can include more or fewer query processing groups with fewer or more computing nodes. In some embodiments, a QGP may execute one query at a time, though in other embodiments multiple queries may be executed concurrently by a QGP.

In certain embodiments, the set of computing nodes in a QPG (e.g., 122A) may comprise a coordinator node 124A and a set of one or more worker nodes 138A-138M. The coordinator node 124A keeps track of the activity of each of its worker nodes 138A-138M and coordinates the execution of queries carried out by the worker nodes. When the query execution engine 120 schedules a query for processing, the coordinator node 124A breaks up the execution of the query into a hierarchy of stages. Each stage is implemented as a series of tasks that are distributed over the set of worker nodes. The coordinator node creates a logical model (also referred to herein as a query execution plan) of the query involving a series of stages which are then translated into a series of connected tasks executed by the worker nodes. In certain embodiments, query execution by the coordinator node involves the assignment of a certain number of "splits" to each worker node. A "split" may refer to a section of a larger data that is being processed by the series of connected tasks executed by the worker nodes.

The worker nodes (e.g., 138A-138M) are responsible for executing tasks and processing data as part of servicing queries. The worker nodes fetch data from the data sources 126 via connectors (not shown in FIG. 1) and may exchange intermediate data with each other. The coordinator node (124A) is responsible for obtaining results from the worker nodes and returning the final results to the client 106. In some embodiments, the worker nodes may communicate with other worker nodes and the coordinator node using a Representational State Transfer (REST) API.

In some embodiments, the query execution service 118 may perform the selection of worker nodes (e.g., from a resource pool 140 of nodes 142 that are available or will be available at some point in time) to be added into particular groups of nodes. The selection of nodes may be based on a variety of performance characteristics of the nodes such as the resource capacity associated with the worker nodes, the number of queries executed within a period of time by the worker nodes, the type and complexity of the queries executed by the worker nodes, and so on.

The query execution engine 120 in some embodiments includes or utilizes a resource pool 140. The resource pool 140 comprises a collection of computing nodes 142 that are available for executing user-provided queries against data stored by (or accessible to) to the provider network. The query execution service 118 performs the re-allocation of computing resources in the resource pool by identifying computing nodes in the provider network (e.g., belonging to QPGs 122A-122N) that can be preempted. In certain embodiments, the query execution service 118 can identify computing nodes for preemption in response to determining that an available amount of resources in the resource pool is less than a threshold value. In other embodiments, the query execution service 118 can perform the preemption of computing nodes responsive to query requests received from users of the provider network. The query execution service 118 can also perform the preemption of computing nodes on a periodic basis so ensure that the distribution of resources among multiple competing queries in the provider network is balanced, especially, during times of low resource capacity.

FIG. 1 describes a scenario in which the query execution service 118 identifies computing nodes for preemption in response to a query request from a user. However, as noted above, the identification of computing nodes for preemption can be triggered by the query execution service at any time, for instance, in response to a determination that an available amount of resources in the resource is less than a threshold value, or simply on a periodic basis so ensure that there is a fair distribution of resources in the provider network.

In certain embodiments, the query execution service 118 identifies a first computing node from a first group of nodes (e.g., QPG 122A) as a candidate to be preempted. For instance, the first computing node could be processing tasks as part of processing a first query in the provider network. The query execution service 118 then causes the first computing node to be removed from further executing tasks as part of processing the first query in the first group while other computing nodes of the first group continue to execute tasks as part of processing the first query. The query execution service 118 may thus move the first computing node back into a collection of available nodes 142 in a resource pool 140, and later add the first computing node to a second group of nodes (e.g., QPG 122N) to execute tasks as part of processing a second query. However, in some embodiments when the disclosed preemption operations are performed "inline" for a new query, the query execution service 118 may alternatively directly move the first computing node from one group to another without formally moving it to a resource pool. Accordingly, in some embodiments, preemption may occur responsive to receipt of a particular query (e.g., to find suitable computing resources for executing that query), though in some embodiments, preemption may occur responsive to other events, such as a periodic preemption check, detection of an amount of available resources in the resource pool falling beneath a particular threshold value, etc. Thus, with regard to FIG. 1, preemption operations are described as occurring within the context of finding computing resources for a particular query, though it is to be understood that this may not be the case in various embodiments, which may proactively maintain sufficient computing resource capacity by performing preemption at other times or based on other events.

In some embodiments, at (1), a user 102 (e.g., via a client 106 application executed by one or more electronic devices 104) may seek to utilize the query execution service 118 of the provider network 100 by interacting with the client 106 (e.g., via a user interface), causing the client 106 to send a query request 110 to query a set of data (130, 134) stored in one or more data sources 126. In other embodiments, the query request 110 may be transmitted by the client 106 without any instant user 102 interaction. Although not depicted, the client 106 may also execute within the provider network 100 (e.g., via another service, such as a hardware virtualization service, on-demand code execution service, etc.) or as part of another network. Examples of an electronic device 104 include personal computers (PCs), cell phones, handheld messaging devices, laptop computers, set-top boxes, personal data assistants, electronic book readers, wearable electronic devices (e.g., glasses, wristbands, monitors), and the like.

The query request 110 may include an identifier of a dataset (e.g., data 134) in a particular database instance 133. For instance, the identifier may be a "namespace" or a Uniform Resource Locator (URL) associated with a database instance 133. In one example, the query request 110 may include a query (e.g., a Structured Query Language (SQL) statement) to be executed against a set of data stored in a data source 126. In certain embodiments, the query execution service 118 may be implemented as a web service and a user 102 may interact with the query execution service 118 by sending the query request 110 as a web service Application Programming Interface (API) call via a Hyper Text Transfer Protocol (HTTP) message and receiving a query response (API response) sent by the query execution service 118 as an HTTP response message.

Data source(s) 126 may include a storage service 128, a database service 132, or the like. Database service 132 may include one or more database instances 133 that can store a set of data 134 related to a tenant or customer or user of the provider network 100. In some examples, the database service 132 can be implemented as a relational database service, though in other embodiments a database service 132 can implement a different type of database, such as a NoSQL database or the like. In a similar manner, storage service 128 can also store a set of data 130 related to various tenants or customers or users of the provider network 100, which can be stored in a variety of formats including but not limited to spreadsheets, plaintext files (e.g., Comma Separated Values (CSV) files, Tab Separated Values (TSV) files), or other representations or data structures that can be accessed and processed by the query execution engine 120. Thus, the sets of data 130 and 134 may include database tables, collections of records, files, data structures, and the like. The datasets may be and/or include a variety of types of data (e.g., integers, strings/text, Booleans, real/floats, documents, etc.), and may represent nearly any type of information (e.g., metrics representing computing device or service performance data, customer/sales information, biological information, financial records, etc.).

At (2), a query request 110 comprising (or identifying) a query is received by a resource controller 112 of the query execution service 118. In response to receipt of this query request 110, a preemption agent 114 may determine whether there are sufficient amounts, numbers, and/or types of resources (e.g., nodes 142 in the resource pool 140) available to execute the query. In some scenarios, there may be sufficient resources available, and thus the resource controller 112 can cause one or more of the nodes 142 to be utilized (e.g., together as part of a QPG 122) to perform the query.

However, in some embodiments the resource controller 112 may determine that sufficient "free" resources are not available. This may result due to another query having been granted additional (or "extra") resources (e.g., computing nodes 142) from the resource pool 140 to increase the performance of the query's execution to make use of the (previously) spare, unused computing node 142 capacity that was available in the pool 140 but not being used. However, as another query now requires execution, the resource controller 112 may now need to preempt some of these "extra" resources that were granted (or loaned) for the other query, and instead use these resources for processing the new query, ensuring that the earlier query does not prevent other queries from being executed.

In certain embodiments, the preemption agent 114 in the resource controller 112 initially determines if preemption of resources (e.g., computing nodes) is necessary—e.g., to service the incoming query request (as shown in FIG. 1), or due to another condition being satisfied). The preemption agent 114 may utilize a variety of factors to make this determination. These factors may include, for instance, the percentage of computing resources in the resource pool that are occupied by currently executing queries, a percentage of unused (or, free) resources in the resource pool, or the number and type of resources assigned to currently executing queries in the provider network. For instance, if the percentage of available resources in the resource pool is below a certain threshold (e.g., 15%), then the preemption agent 114 may determine that preemption of one or more resources is necessary to service the new query. Or, for instance, if the resources assigned to currently executing queries has exceeded a certain resource limit (e.g., because they were given extra resources when there was excess resource capacity in the resource pool), then the preemption agent 114 may determine that preemption of at least some of those resources are necessary to service the new query. As used herein, the resource limit may refer to a per-customer resource limit that was initially assigned to a particular user, customer, or tenant of the provider network for executing queries in the provider network.

Once the preemption agent 114 has determined that preemption of resources is necessary, the preemption agent 114 identifies the resources (e.g., computing nodes) in the groups of nodes (QPG 122A, QPG 122N) that are potential candidates for preemption 116. The preemptable candidate nodes can be determined based on a variety of factors such as the resource capacity associated with the groups of computing nodes, a number of currently executing queries in the groups of nodes, the type (stateless/stateful) of the queries and/or the complexity of the queries being executed in the groups, the amount of data (e.g., number of bytes) required by the data sources to process the queries from those groups and so on. For instance, the preemption agent 114 may identify one or more computing nodes in a particular group of nodes (e.g., QPG 122A) as candidates to be preempted based on the fact that those nodes have sufficient resource capacity to execute the incoming query, have already executed most of the operations required to complete execution of their existing queries, and/or are largely executing stateless operations as part of processing queries in their group.

At (3), the resource controller 112 transmits a request to preempt the one or more identified computing nodes to the query execution engine 120. For instance, the resource controller 112 may identify that a particular worker node (worker node 138M) in a first group of nodes (QPG 122A) is a candidate to be preempted and then transmit a request to the coordinator node 124A in the QPG 122A to preempt the worker node 138M that includes an identifier of a particular node, or an identifier of a number of nodes from the group that need to be preempted (which may be the case if all worker nodes have similar resource configurations/amounts) . Thus, in some embodiments the resource controller 112 may instead send a request to the coordinator node to preempt some unspecified node or nodes, and the coordinator node may then decide itself which node(s) are to be preempted.

At (4), the coordinator node 124A initiates the preemption of the worker node 138M (or, each of potentially multiple worker nodes) by determining the types of tasks that are being executed by the worker node 138M as part of processing its query. For instance, at (4) the coordinator node 124A may determine that the types of tasks being executed by the worker node 138M comprise stateless operations. Or, for instance, at (4), the coordinator node 124A may determine that the types of tasks being executed by the worker node 138M comprise stateful operations. Stateless operations may include, for instance, filtering operations in queries that do not need to maintain state information. Stateful operations may refer to operations in queries that need to maintain state data to continuously update their results. For instance, stateful operations in queries may include aggregation operations, join operations, and the like.

Figure 2:
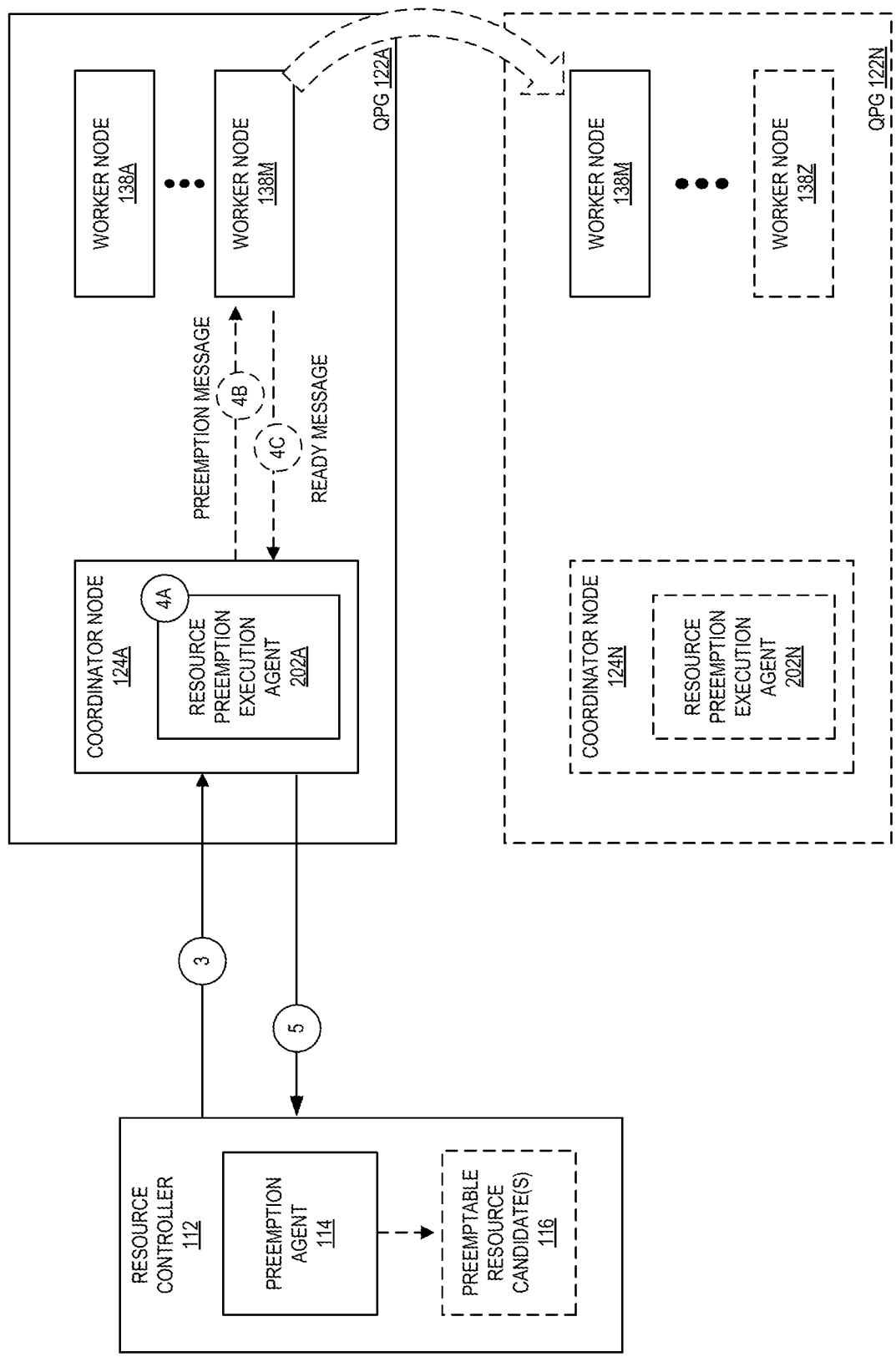
FIG. 2 is a diagram illustrating exemplary messaging between components of an environment for preempting a computing node executing stateless operations as part of executing a query in its group of nodes.

The set of operations performed by the coordinator node to remove a worker node from executing stateless operations as part of processing a query from its group of nodes is discussed in more detail in FIG. 2. The set of operations performed by the coordinator node to remove a worker node from executing stateful operations as part of processing a query in its group of nodes is discussed in more detail in FIG. 3.

At (5), the coordinator node 124A may transmit an identifier of the worker node to the resource controller 112 to indicate to the resource controller 112 that the identified worker node 138B is ready to be released from the first group of nodes (QPG 122A).

At (6), the coordinator node 124A causes the preemption of the worker node 138M by releasing the worker node 138M into the resource pool 140. The worker node may then be re-instantiated, "cleaned" up, restarted, etc., in the resource pool 140 so that it is ready to perform different tasks for potentially different customers of the provider network—e.g., to execute the newly-arrived but unprocessed query. This process may effectively reset the node so that no remnants of any previous executions or customer activity (e.g., data from previous query processing operations) remain. At (7), the query execution engine 120 (e.g., responsive to a command from the resource controller 112) adds the worker node into a second group of resources (QPG 122N) for executing the unprocessed query.

At (8), the resource controller 112 may transmit the query to be executed to the coordinator node 124N in the second group of nodes (QPB 122N). At (9), the coordinator node 124N causes the execution of the query against a dataset (e.g., 134) in the data sources 126. At (10) the database instance 133 provides a query result to the coordinator node 124N. Optionally, a query adaptor (not shown in FIG. 1) in the coordinator node 124N may transform the query result into a query format that is suitable for the client 106—e.g., the query adapter may transform a database engine-specific query result format into a common format using eXtensible Markup Language (XML), JavaScript Object Notation (JSON), etc.

At (11), the coordinator node 124N transmits a query response 136 to the client 106 based on the query result, which may pass via an endpoint of the provider network.

The query response 136 may comprise one or more HTTP messages carrying a payload with the query result (or a "transformed" query result generated by the coordinator node as indicated above, etc.).

In the embodiments discussed above, the query execution service 118 identified computing nodes in the groups of nodes as potential candidates to be preempted in response to receiving a query request from a user. In alternate embodiments, the query execution service 118 can also identify computing nodes as candidates to be preempted without any connection to received query requests from users, and thus cause these additional computing nodes to be released back into the resource pool (e.g., to service future query requests). As one example, the query execution service 118 may use a forecast (e.g., via a forecasting service of the provider network) to determine there is a high likelihood of a need for more available resources in the resource pool 140 at some point in time in the future, and preemptively begin preemption prior to that point in time. Alternatively, the query execution service 118 may determine that an amount of available computing resources in the resource pool falls beneath some threshold value. Notably, this threshold value may be set much lower than in previous systems not utilizing these cooperative preemption techniques due to the ability to quickly obtain additional computing resources for queries, resulting in higher overall utilization of the resources, better performance for queries in the system (via being able to assign additional processing resources), etc. The identification of the computing nodes by the query execution service 118 in this manner results in improved utilization of computing resources in the resource pool. For example, in some embodiments, the query execution service 118 may allow for the more aggressive allocation of unused resources because these resources can be preempted and made available to satisfy future requests needing those resources, thus resulting in improved utilization of computing resources in the resource pool.

Figure 3:
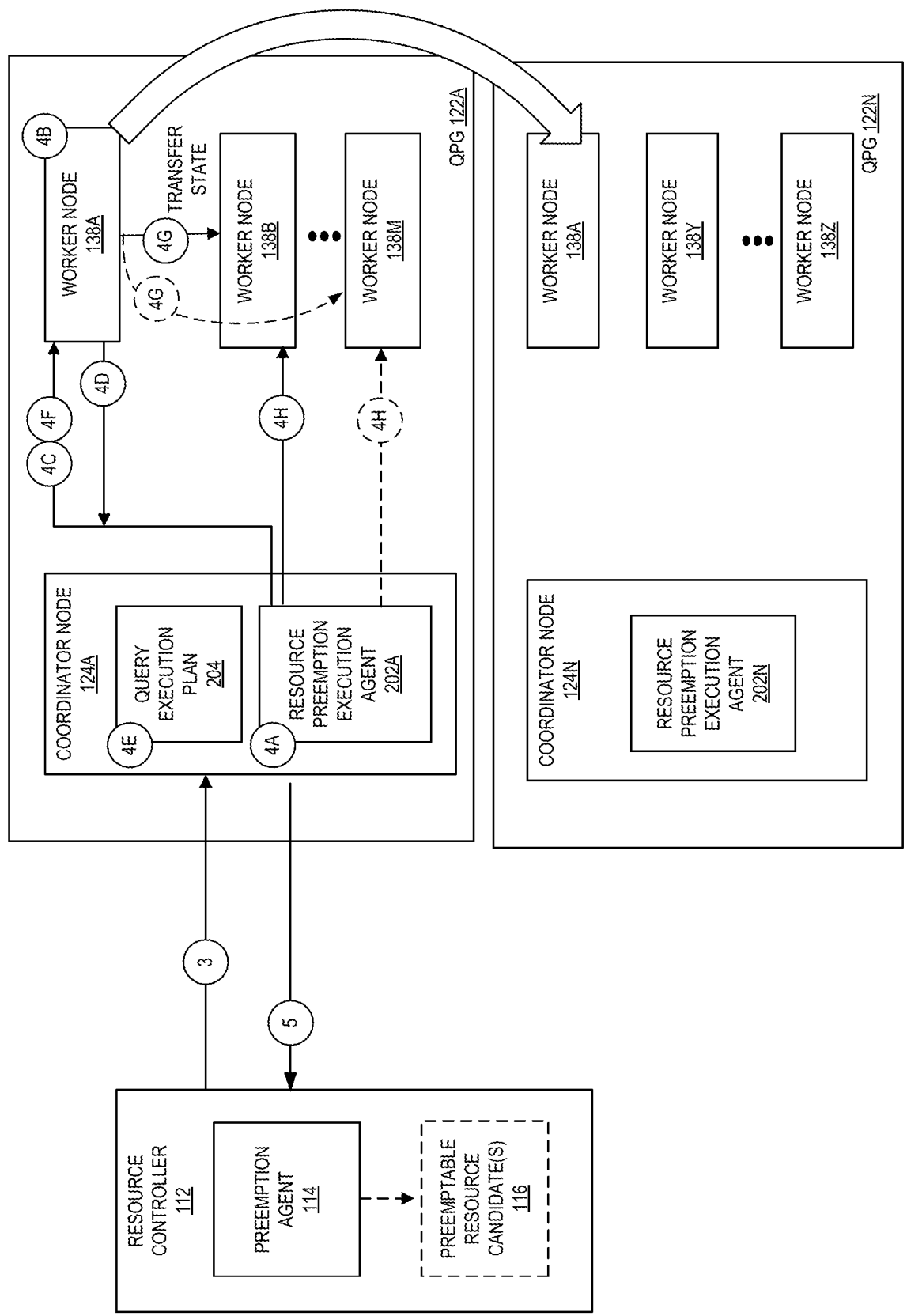
FIG. 3 is a diagram illustrating exemplary messaging between components of an environment for preempting a computing node executing stateful operations as part of executing a query in its group of nodes.

The communication of information between one or more components in FIG. 1 to process queries from users is further described in relation to FIGS. 2 and 3 below. For example, FIG. 2 shows an example messaging flow between one or more components in FIG. 1 when the coordinator node identifies, for preemption, a first computing node that is executing stateless operations as part of processing a query. FIG. 3 shows an example messaging flow between one or more components in FIG. 1 when the coordinator node identifies, for preemption, a first computing node that is executing stateful operations as part of processing a query.

FIG. 2 is a diagram illustrating exemplary messaging between components of an environment for preempting a computing node executing stateless operations as part of executing a query in its group of nodes. FIG. 2 shows an example messaging flow between one or more components of the query execution service 118 in FIG. 1 such as a resource controller 112, and QPGs 122A and 122N. It is to be understood that this messaging flow is only one messaging flow that could be used to implement some embodiments, and various alternate formulations with more or fewer messages, messages in different orderings, more or fewer or different components, etc., could alternatively be used and implemented by one of ordinary skill in the art in possession of this disclosure to implement various embodiments described herein.

The resource controller 112 of the query execution service 118 may initiate this process by transmitting a request to the coordinator node 124A in the first group of nodes (QPG 122A) to preempt a computing node. For instance, at (3), the resource controller 112 may identify that a worker node (138M) in the first group of nodes (QPG 122A) can be preempted and then transmit a request to the coordinator node 124A in the QPG 122A to preempt the worker node 138M. In response to the request, at (4A), a resource preemption execution agent 202A in the coordinator node 124A determines that the types of tasks being executed by the worker node 138M comprise stateless operations. In certain embodiments, at (4A), the resource preemption execution agent 202A may identify, from a task queue (not illustrated) associated with the worker node 138M or from a query plan defining which worker nodes are performing what tasks, one or more tasks (comprising the stateless operations) that require completion. At this point, the resource preemption execution agent 202A may stop adding additional tasks to the task queue associated with that worker node. At (4B), the resource preemption execution agent 202A transmits a preemption message to the worker node 138M to cause the worker node 138M to complete the execution of its tasks as part of processing its queries in its group. At (4C), the resource preemption execution agent 202A receives a ready message from the worker node 138M as an indication that the worker node has completed all the tasks in its task queue. At this point, the resource preemption execution agent 202A causes the worker node 138M to be preempted by releasing the worker node back into the resource pool (illustrated in FIG. 1) to free the worker node. The worker node 138M may then, e.g., be re-instantiated into the resource pool and thereafter added to the second group of nodes (e.g., QPG 122N) to execute the incoming query request from the user.

In certain embodiments, instead of transmitting a preemption message to the worker node 138M as discussed above, the preemption execution agent 202A may itself monitor the remaining tasks in the task queue to determine when the worker node has completed execution of all its tasks in the task queue. When the preemption execution agent 202A determines that the worker node has completed execution of all tasks in the task queue it causes that worker node to be made available in a resource pool in the provider network, e.g., by sending a message at (5) indicating that the worker node is ready to be removed from the QPG.

In certain embodiments, the resource preemption execution agent 202A may not wait for the worker node 138M to complete all its tasks in its task queue and instead cause the worker node to be preempted prior to the completion of execution of its tasks. For instance, if the worker node is performing the filtering and propagation of the filtered data as part of as part of processing its queries in its group, the resource preemption execution agent 202A may identify another worker node that can take up these tasks and coordinate with that other worker node to continue execution of the tasks of the preempted worker node.

FIG. 3 is a diagram illustrating exemplary messaging between components of an environment for preempting a computing node executing stateful operations as part of executing a query in its group of nodes. FIG. 3 shows an example messaging flow between one or more components of the query execution service 118 in FIG. 1 such as a resource controller 112, and QPGs 122A and 122N. It is to be understood that this messaging flow is only one messaging flow that could be used to implement some embodiments, and various alternate formulations with more or fewer messages, messages in different orderings, more or fewer or different components, etc., could alternatively be used and implemented by one of ordinary skill in the art in possession of this disclosure to implement various embodiments described herein.

The resource controller 112 of the query execution service 118 may initiate this process by transmitting a request to the coordinator node 124A in the first group of nodes (QPG 122A) to preempt a computing node. For instance, at (3), the resource controller 112 may identify that a worker node (138A) in the QPG 122A can be preempted and then transmit a request to the coordinator node 124A in the QPG 122A to preempt the worker node 138A. In response to the request, at (4A), a resource preemption execution agent 202A in the coordinator node 124A determines that the types of tasks being executed by the worker node 138A comprise stateful operations (or at least one stateful operation). At (4B), the resource preemption execution agent 202A determines a processing state of the worker node 138A executing the stateful operations as part of processing its query. For example, a worker node could be in different "states" while executing its query. For instance, a worker node could be in a "pending" state if it still has pending query operations to be executed, in a "running" state if it is currently executing one or more query operations (stateful or stateless), or in a "completed" state if the worker node has finished executing its query operations. In other examples, the resource preemption execution agent 202A could also determine other intermediary "states" associated with the worker node. These states could include, for instance, a "failed" state indicating a failure of completion of a particular query operation by the worker node, a "cancelled" state indicating that a particular query operation in the worker node was cancelled, and so on.

At (4C), the resource preemption execution agent 202A transmits a preemption message to the worker node 138A to cause the worker node 138A to complete the execution of its tasks as part of processing its queries in its group. This message may also cause the worker node 138A to begin saving and/or organizing any intermediate processing results (or "state").

At (4D), the resource preemption execution agent 202A receives a ready message from the worker node 138A as an indication that the worker node has completed all the tasks in its task queue and/or has saved its state.

At (4E), the resource preemption execution agent 202A may analyze and update a query execution plan 204 of the query being executed. This may involve, for instance, updating the query execution plan to cause ones of the worker nodes (138B, 138M) to perform additional (or different) operations based on the state of the worker node being preempted, e.g., to accommodate the loss of the preempted node.

Thus, the resource preemption execution agent 202A may then identify one or more computing nodes in the QPG 122A that can take up the execution of the stateful operations being performed by the worker node 138A and cause intermediate state of the worker node 138A (e.g., data comprising results from processing certain operations that will later need to be used to perform other operations for the query, which now will be performed by other worker nodes) to be transferred to one or more of these computing nodes by sending a command at (4F) to the worker node 138A. The determination of candidate worker nodes for state transfer may be based on a variety of factors. For instance, the resource preemption execution agent 150A may take into consideration the type and complexity of the queries currently being executed by the worker nodes (138B, 138M), the number of splits being executed by the worker nodes, or whether a majority of tasks being executed by the worker nodes themselves comprise stateless or stateful operations to determine the candidate worker nodes for state transfer. In some situations, if the worker node 138A has written a partial set of results to a data storage (e.g., the database instance 133), the resource preemption execution agent 202A may allow the worker node to finish the execution of its tasks before identifying other worker nodes that can take over the tasks of this node. If the resource preemption execution agent 202A decides to reuse results that have already partially been written to a data source by the worker node, it identifies the specific query operation (e.g., a filtering operation) that was in progress, identifies the data that was already processed by the query operation, and then identifies other workers (or, for e.g., a coordinator node) that can take up the remaining execution of tasks of the worker node. The worker node 138A may then send its state at (4G) to particular other nodes (e.g., identified in the message at (4F)), or return the state to the coordinator node 124A, which itself may distribute the state (or identify a storage location of the state) to other worker nodes.

In the example shown in FIG. 3, the resource preemption execution agent 202A has identified one or more of worker nodes (138B, 138M) as candidates for continuing execution of the stateful operations being performed by the worker node 138A. For instance, the resource preemption execution agent 202A can transfer (or cause the transfer of) some of the state of the worker node 138A to worker node 138B (e.g., only that part of the state it needs) and some of the state to worker node 138M (that it needs) as shown at (4G). In other instances, the resource preemption execution agent 202A can transfer the entire state of the worker node 138A to one of the other worker nodes, or to all the other worker nodes. Alternatively, the resource preemption execution agent 202A may simply cause the state to be stored at a storage/memory location (e.g., of a storage service) that is accessible to all workers that need to obtain it.

At this point, the resource preemption execution agent 202A causes the worker node 138A to be preempted by releasing the worker node back into the resource pool (illustrated in FIG. 1). The worker node 138A may then be re-instantiated into the resource pool and thereafter added to the second group of nodes (e.g., QPG 122N) to execute the incoming query request from the user.

In certain embodiments, at (4H), the resource preemption execution agent 150A may send a task update message to the computing nodes (138B, 138M) to indicate to the computing nodes to begin performing the stateful operations of the worker node 138A that was just preempted. This may be based, for example, on the query execution plan 204 updated at circle (4E). In some embodiments, the operations at (4H) may alternatively include adding or modifying particular tasks or "jobs" placed into a job queue for these worker nodes based on the updated query execution plan 204.

Figure 4:
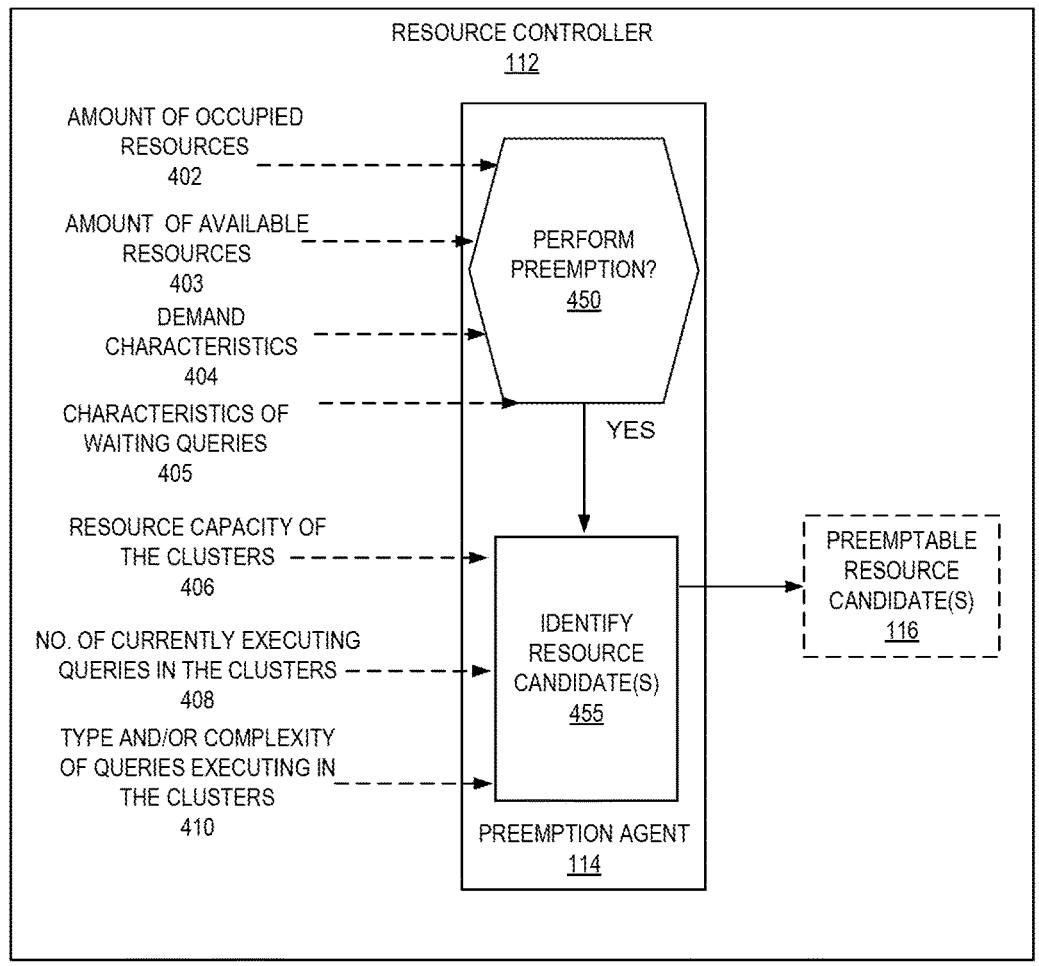
FIG. 4 illustrates the types of information utilized by a resource preemption controller to determine a set of preemptable resource candidates, according to one embodiment of the present disclosure.

FIG. 4 illustrates the types of information utilized by the resource controller 112 to determine whether preemption is needed and/or determine a set of preemptable resource candidates, according to one embodiment of the present disclosure. It is to be understood that the types of information illustrated in FIG. 4 are for illustrative purposes only to implement one embodiment of the present disclosure. Various alternate types of information with more or fewer type could alternatively be used and implemented by one of ordinary skill in the art in possession of this disclosure to implement various embodiments described herein.

In certain embodiments, the resource controller 112 (e.g., preemption agent 114) identifies whether preemption is to occur (at block 450) and/or which candidate computing resources (e.g., computing nodes) should be preempted at block 455.

For example, the resource controller 112 may identify the set of candidate computing resources to be preempted (at block 455) in response to determining that an available amount of resources (via signal 404) in the resource pool is less than a threshold value (as part of block 450). The resource controller 112 perform this check on a periodic basis to ensure that the distribution of resources among multiple competing queries in the provider network is balanced, especially, during times of low resource capacity. Or for instance, the resource controller 112 may perform this determination responsive to query requests received from users.

Thus, in some embodiments, the preemption agent 114 in the resource controller 112 may determine 450 whether to perform preemption of one or more computing resources. The preemption agent 114 may utilize a variety of factors to determine that preemption of resources is necessary. These factors may include, for instance, an amount (e.g., a percentage) of computing resources in the resource pool that are occupied by currently executing queries 402 (and thus are unavailable), a percentage of unused (or, available) resources in the resource pool 403, characteristics 405 of queries needing to be processed, etc.

Other factors used by the preemption agent 114 to determine whether preemption is to be performed can be based on the demand characteristics of the resource pool 404 such as the number of queries arriving into the system at different time intervals, the actual availability of resources in the resource pool, or a target availability of resources in the resource pool. For example, if the actual availability of resources in the resource pool is above a certain threshold (configured to ensure that a safe amount of resources is always available), the preemption agent 114 may determine that preemption is not necessary to service an incoming query request. As another example, if the number of queries arriving into the system is above a certain threshold (e.g., 100 queries every 5 minutes) and the actual availability of resources in the resource pool is below a certain threshold, the preemption agent 114 may determine that preemption is necessary to service the incoming query requests. The preemption agent 114 may also identify candidates _for preemption based on the computing capabilities (CPU, network bandwidth, and so on) of the computing nodes in the resource pool and the number of resources being using by the computing nodes to process queries in the provider network. For instance, if the computing capabilities of one or more computing nodes falls below a certain threshold, the preemption agent 114 may not identify these nodes as candidates for preemption.

For example, if the percentage of available resources in the resource pool is below a threshold (e.g., 15%, 10%), then the preemption agent 114 may determine that preemption of one or more resources is necessary to service the currently executing queries or to service future queries. Or, for instance, if the resources assigned to currently executing queries has exceeded a certain resource limit (e.g., because they were given extra resources when there was excess resource capacity in the resource pool), this may also be a factor in determining that preemption of at least some of those resources are necessary to service the future query requests. As another example, if some very complex queries are needing to be processed that will require substantial amounts of computing resources, this may be another factor in determining that preemption of at least some of those resources may be necessary.

Once the preemption agent 114 has determined that preemption of resources is necessary, the preemption agent 114 identifies the resources (e.g., computing nodes) 455 in the groups of nodes (QPG 122A, QPG 122N) that are potential candidates for preemption 116. The preemptable candidate nodes can be determined based on a variety of factors such as the resource capacity associated with the groups of computing nodes 406, a number of currently executing queries in the groups of nodes 408, the type (stateless/stateful) of the queries and the complexity and/or priority of the queries being executed in the groups 410, other characteristics of the queries such as the length of time the queries took to execute in the past, the number of bytes required by the data sources to process the queries from those groups, a likely completion time of queries currently being executed in the groups, and so on. For instance, the preemption agent 114 may identify one or more computing nodes in a particular group of nodes (e.g., QPG 122A) as candidates to be preempted based on the fact that those nodes have sufficient resource capacity to service currently executing or new queries, have already executed most of the operations required to complete execution of their existing queries, and/or are largely executing stateless operations as part of processing queries in their group. Additionally, the preemption agent 114 may seek not to preempt resources for queries that will complete processing on their own very soon, etc.

Figure 5:
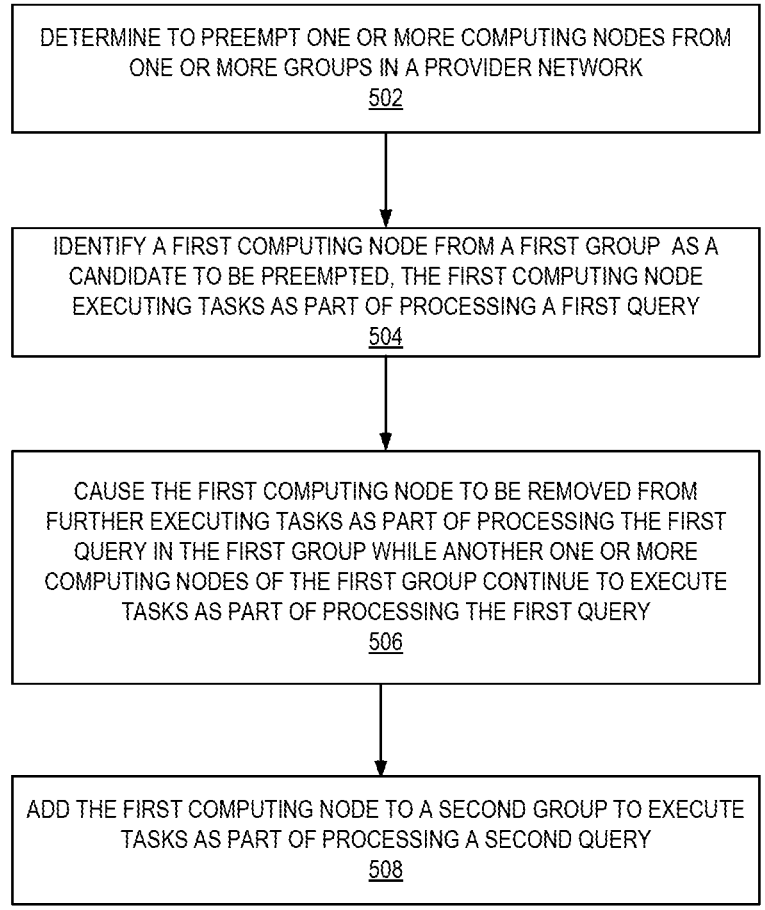
FIG. 5 is a flow diagram illustrating operations of a method for cooperative preemption of resources in a provider network, according to some embodiments.

FIG. 5 is a flow diagram illustrating operations 500 of a method for cooperative preemption of resources in a provider network, according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the query execution service 118 in the provider network 100 shown in FIGS. 1-3.

The operations 500 include, at block 502, determining whether to preempt one or more computing nodes from one or more groups (122A, 122N) in a provider network 100 (e.g., based on an availability amount of a resource pool). In one embodiment, the resource controller 112 in the query execution service 118 makes this determination. For instance, this determination could be made in response to determining that an available amount of resources in the resource pool is less than a threshold value, responsive to the existence of query requests from users, or simply on a periodic basis to ensure that the distribution of resources among multiple competing queries in the provider network is balanced, especially, during times of low resource capacity.

The operations 500 further include, at block 504, identifying a first computing node from a first group of the plurality of groups as a candidate to be preempted. The first computing node may be executing tasks as part of processing a first query. In certain embodiments, the resource controller 112 may perform the identification of the first computing node to be preempted. The identification can be based on several factors, which may include, for instance, a resource capacity associated with the first group or the first computing node, a characteristic of the first query, or a number of currently executing queries in the first group.

The operations 500 further include, at block 506, causing the first computing node to be removed from further executing tasks as part of processing the first query in the first group while another one or more computing nodes of the first group continue to execute tasks as part of processing the first query. For instance, the operations at block 504 may include determining that the first computing node is executing stateless operations as part of processing the first query. The operations at block 504 may further include stopping adding additional tasks to a task queue that is utilized by the first computing node. For instance, a resource preemption execution agent 202A in a coordinator node (124A) in the first group of nodes (QPG 122A) may perform this step when it identifies, from a task queue associated with the first computing node, that one or more tasks (comprising the stateless operations) require completion. When the resource preemption execution agent 202A determines that the first computing node has completed execution of all tasks in the task queue, it causes the first computing node to be made available in a resource pool in the provider network.

In certain embodiments, the operations performed at block 506 may additionally include identifying that the first computing node is performing "stateful operations" as part of processing the first query. The operations performed by the query execution service to cause the first computing node to be removed from further executing its tasks (comprising stateful operations) as part of processing the first query in the first group is discussed in detail in FIG. 6.

The operations 500 further include, at block 508, adding the first computing node to a second group to execute tasks as part of processing a second query. The second query may be, for instance, received as a query request at an endpoint of the provider network. In some examples, the query request can comprise a HTTP message carrying a payload comprising the second query. The operations at block 508 further include causing the execution of the second query using the second group, obtaining a query result based on the execution of the query against the set of data, and transmitting a query response that is based on the query result. The query response may comprise one or more HTTP messages carrying a payload with the query result (or a "transformed" query result generated by the coordinator node) as discussed with regard to FIG. 1.

Figure 6:
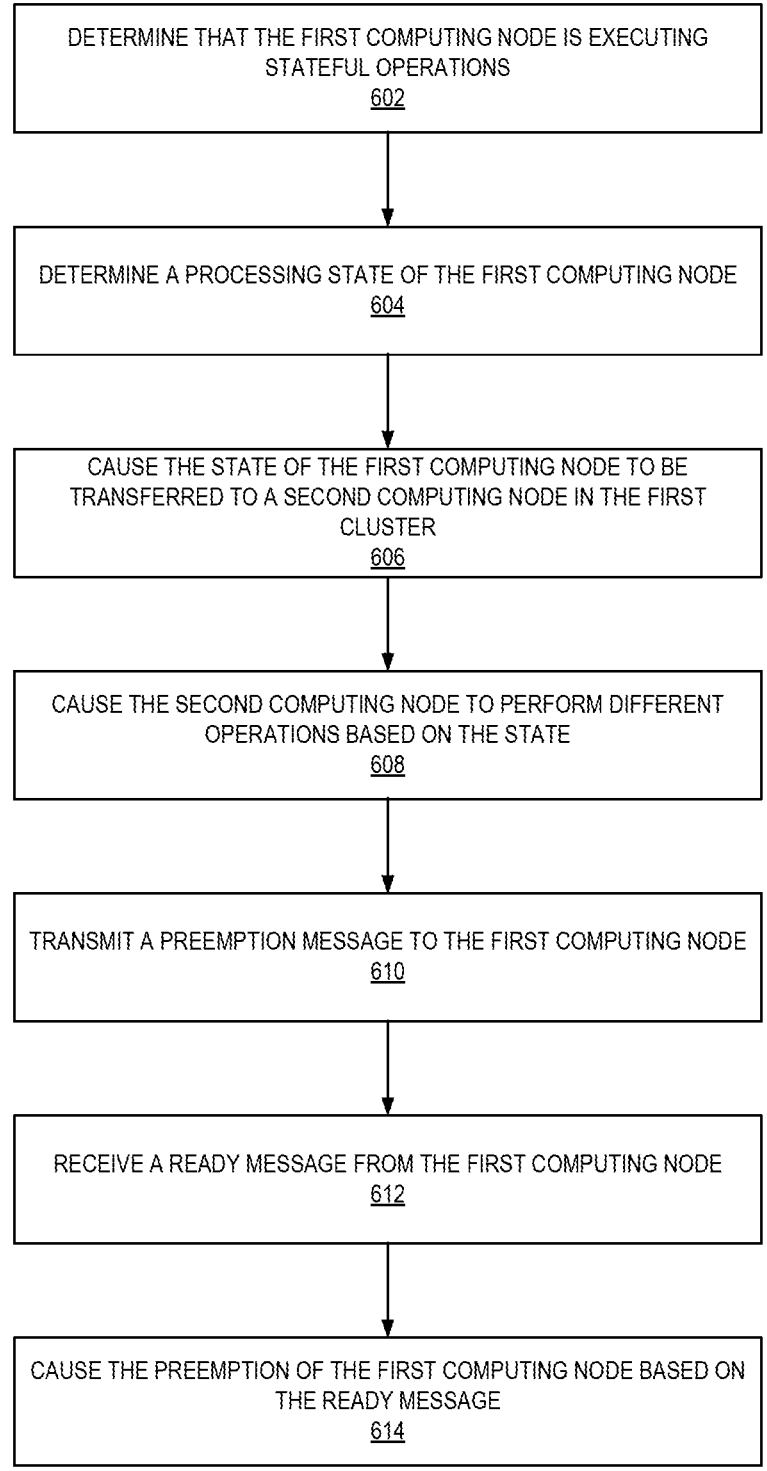
FIG. 6 is a flow diagram illustrating operations of a method performed by the query execution service to remove a computing node that is executing stateless operations as part of processing a query, according to some embodiments.

FIG. 6 is a flow diagram illustrating operations 600 of a method performed by the query execution service to remove a computing node that is executing stateless operations as part of processing a query, according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the query execution service 118 in the provider network 100 shown in FIGS. 1-3.

In certain embodiments, the operations 600 include, at block 602, determining that the first computing node is performing stateful operations as part of processing its query (e.g., a first query). The operations at 602 may include, for instance, determining, from the query execution plan of the first computing node, that the tasks being performed by the first computing node include stateful operations. The operations 600 further include, at block 604, determining a processing state of the first computing node executing the stateful operations as part of processing the first query. As noted above, the first computing node can be in any one of various states such as a "pending" state if it still has pending query operations to be executed, a "running state," if it is currently executing one or more query operations (stateful or stateless), or in a "completed," state if the worker node has finished executing its query operations. Block 604 may thus include receiving a message from the first computing node indicating its state.

The operations 600 further include, at block 606, causing a state (e.g., intermediate data results from performing at least some tasks for servicing a query) of the first computing node to be transferred to a second computing node in the first group of computing nodes. For instance, the resource preemption execution agent 202A in the query execution service 118 may determine that the state (or at least a portion of the state) of the first computing node should be transferred to the second computing node. This determination can be based on, for instance, the type and complexity of the queries currently being executed by the second computing node, the number of splits being executed by the second computing node, the types of operations (stateless/stateful) being executed by the second computing node and so on. The resource preemption execution agent 202A then causes the state of the first computing node to be transferred to the second computing node. For example, the resource preemption execution agent 202A may receive the state from the first computing node, optionally process or transform the state into types/forms useful by other nodes, and transmit the state to those nodes. Alternatively, the resource preemption execution agent 202A may send one or more commands to the first computing node instructing it to transfer some or all of its state to other nodes (that will ultimately use that state).

The operations 600 further include, at block 608, causing the second computing node to perform different operations based on the state. For instance, the operations at block 608 may include updating the query execution plan to cause the second computing node to perform additional (or different) operations based on the transferred state. The operations 600 further include, at block 610, transmitting a first message (e.g., a preemption message) to the first computing node to cause the worker node 138M to complete the execution of its tasks as part of processing its queries in its group. The operations 600 further include, responsive to the first message, at block 612, receiving a second message (e.g., a ready message) from the first computing node comprising an indication that the worker node has completed all the tasks in its task queue Responsive to the operations at block 612, the operations 600 further include, at block 614, causing the preemption of the first computing node based on the second message. For instance, the resource preemption execution agent 202A in the query execution service 118 can cause the first computing node to be preempted by releasing the node back into the resource pool 140. The computing node is re-instantiated in the resource pool 140 and added to a second group of nodes (e.g., QPG 122N) to execute the incoming query request from the user.

Figure 7:
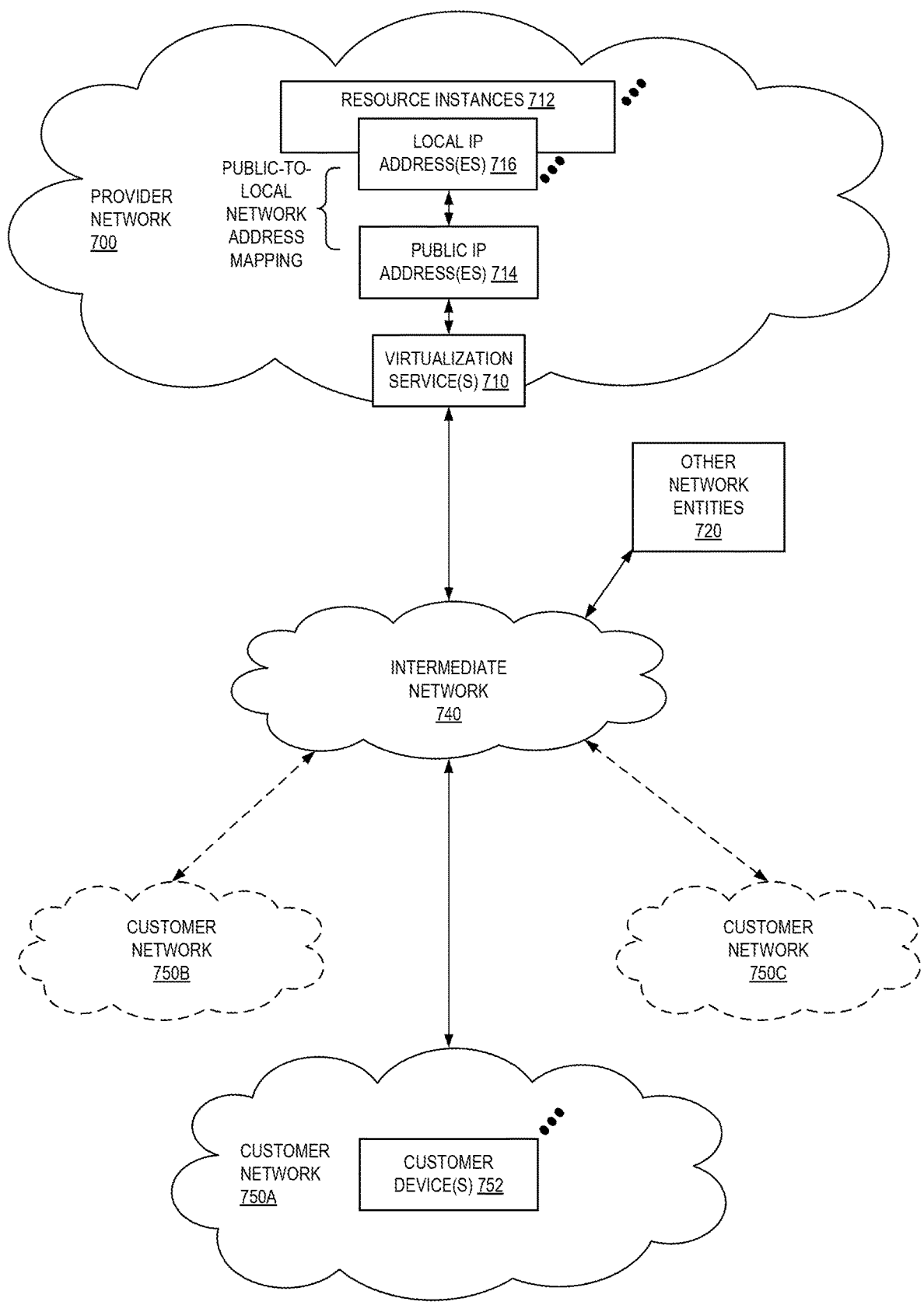
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
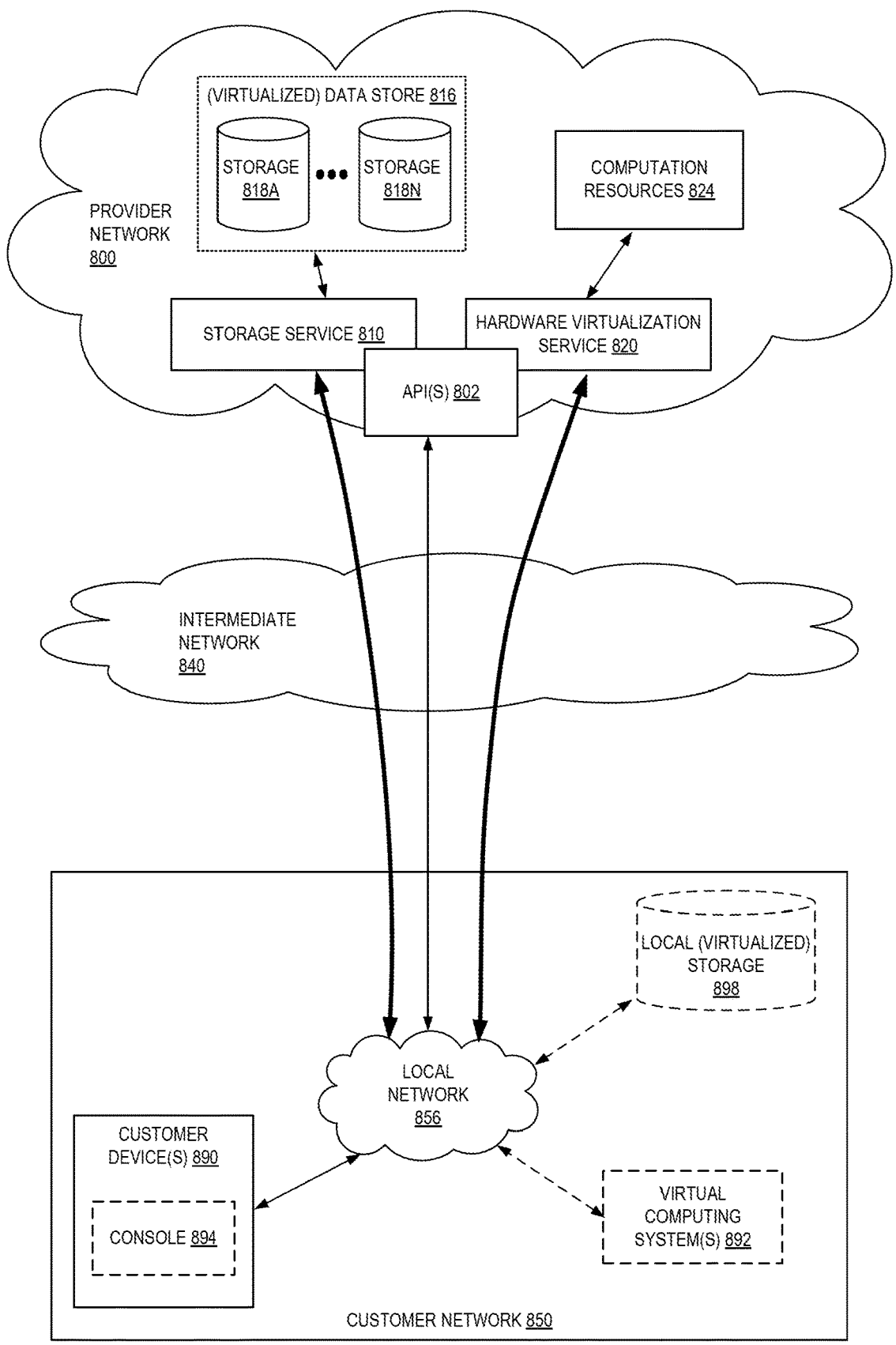
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
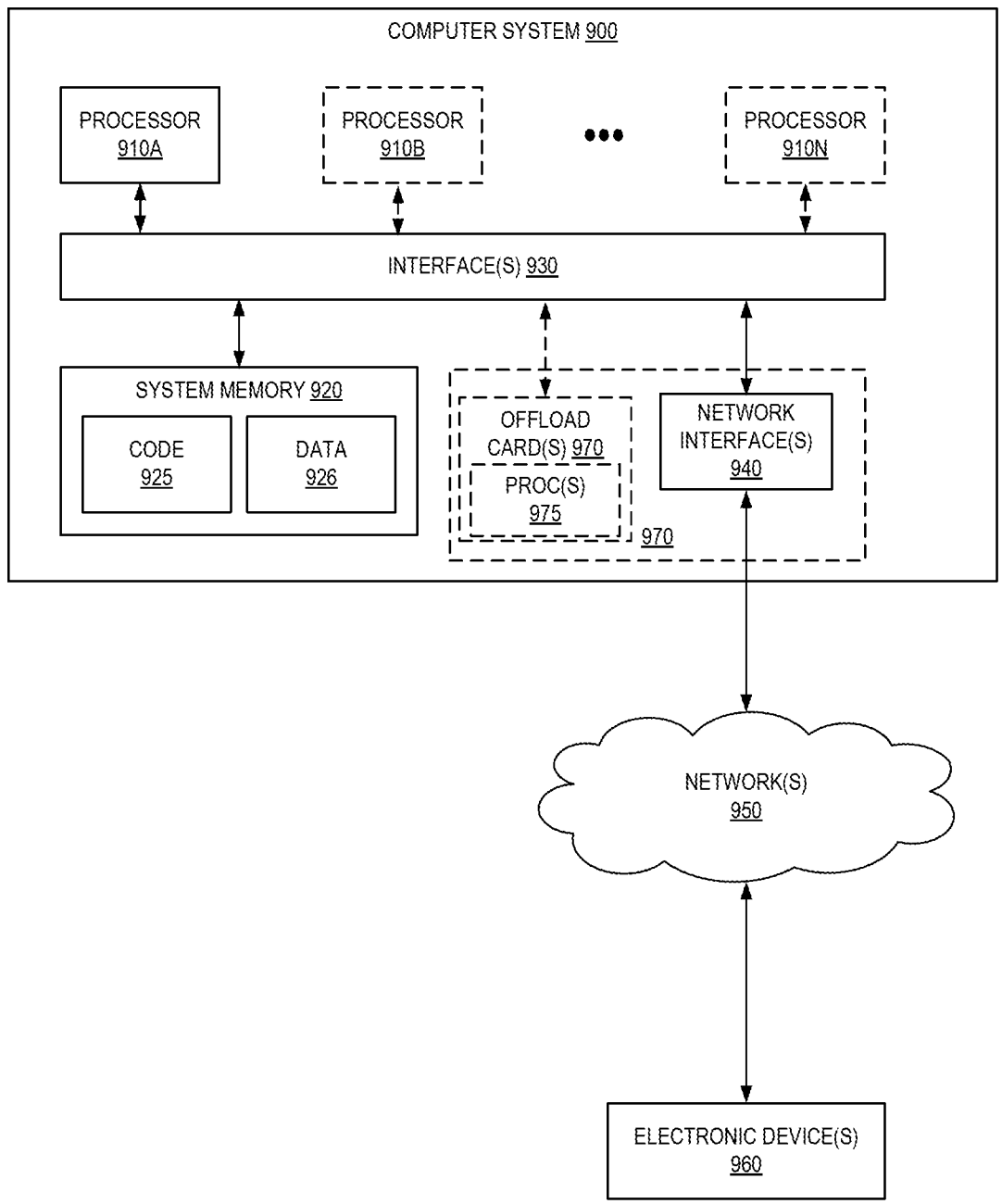
FIG. 9 is a block diagram illustrating an example computer system that may be used in some embodiments.

In some embodiments, a system that implements a portion or all of the techniques for cooperative preemption in a distributed multi-tenant resource pool as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    determining, based on one or more characteristics of a resource pool, to preempt one or more computing nodes from one or more of a plurality of groups in a provider network that are not part of the resource pool;
    identifying a first computing node from a first group of the plurality of groups as a candidate to be preempted, the first computing node executing tasks as part of processing a first query;
    causing the first computing node to be removed from further executing any tasks as part of processing the first query in the first group while another one or more computing nodes of the first group continue to execute tasks as part of processing the first query;
    receiving, at an endpoint of the provider network, a query request comprising a second query, wherein the query request comprises a Hyper Text Transfer Protocol (HTTP) message carrying a payload comprising the second query;
    adding the first computing node to a second group;
    causing the execution of the second query using the second group, the second group including the first computing node and executing different tasks as part of processing the second query;
    obtaining a query result based on the execution of the second query; and
    transmitting a query response that is based on the query result.

2. The computer-implemented method of claim 1, wherein causing the first computing node to be removed from executing tasks as part of processing the first query in the first group comprises:
   determining that the first computing node has completed execution of tasks in a task queue; and
   removing the first computing node from the first group.

3. The computer-implemented method of claim 2, wherein causing the first computing node to be removed from executing tasks as part of processing the first query in the first group further comprises:
   determining that the first computing node is executing stateful operations as part of processing the first query;
   causing a state generated by the first computing node as part of processing the first query to be transferred to a second computing node in the first group; and
   causing the second computing node to perform different operations based on the state.

4. A computer-implemented method comprising:
   determining, based on one or more characteristics of a multi-tenant resource pool, to preempt one or more computing nodes from one or more of a plurality of groups in a provider network;
   identifying a first computing node from a first group of the plurality of groups as a candidate to be preempted, the first group of computing nodes executing tasks as part of processing a first query, wherein the first query comprises a Structured Query Language (SQL) query;
   causing the first computing node to be removed from further executing any tasks as part of processing the first query in the first group while another one or more computing nodes of the first group continue to execute tasks as part of processing the first query; and
   adding the first computing node to a second group to execute other tasks as part of processing a second query,
   wherein the identifying of the first computing node as the candidate or the causing of the first computing node to be removed occurs based on a determination of whether the first computing node is performing stateful or stateless operations as part of processing the first query.

5. The computer-implemented method of claim 4, wherein the determining to preempt one or more computing nodes comprises:
   determining that an amount of available computing nodes in the resource pool of the provider network is less than a threshold value.

6. The computer-implemented method of claim 4, wherein identifying the first computing node as a candidate to be preempted is based on at least one of:
   a resource capacity associated with the first group or the first computing node;
   a characteristic of the first query; or
   a computing capability of the first computing node.

7. The computer-implemented method of claim 4, wherein causing the first computing node to be removed from further executing tasks as part of processing the first query in the first group comprises:
   stopping adding additional tasks to a task queue that is utilized by the first computing node; and
   determining that the first computing node has completed execution of all tasks in the task queue.

8. The computer-implemented method of claim 7, wherein causing the first computing node to be removed from further executing tasks as part of processing the first query in the first group further comprises:
   causing the first computing node to be made available in the resource pool.

9. The computer-implemented method of claim 4, wherein causing the first computing node to be removed from further executing tasks as part of processing the first query comprises determining that the first computing node is executing stateless operations as part of processing tasks for the first query.

10. The computer-implemented method of claim 4, wherein causing the first computing node to be removed from further executing tasks as part of processing the first query in the first group comprises:
    determining that the first computing node is executing stateful operations as part of processing the first query;
    causing a state that was generated by the first computing node as part of executing the stateful operations as part of processing the first query to be transferred to a second computing node in the first group; and
    causing the second computing node to perform different or additional operations based on the state.

11. The computer-implemented method of claim 10, further comprising:
    transmitting a preemption message to the first computing node to cause the first computing node to complete execution of tasks as part of processing the first query;
    receiving a ready message from the first computing node indicating that the first computing node has completed execution of the tasks; and
    causing the preemption of the first computing node based at least in part on the receiving of the ready message.

12. The computer-implemented method of claim 4, further comprising:
    receiving, at an endpoint of the provider network, a query request comprising the second query, wherein the query request comprises a HyperText Transfer Protocol (HTTP) message carrying a payload comprising or identifying the second query;
    causing the execution of the second query using the second group;
    obtaining a query result based on the execution of the query; and
    transmitting a query response that is based on the query result.

13. The computer-implemented method of claim 4, further comprising:
    prior to identifying the first computing node as a candidate to be preempted, adding the first computing node to the first group after the first group began processing the first query to improve performance of the first group in processing the first query.

14. The computer-implemented method of claim 4, wherein causing the first computing node to be removed from further executing tasks as part of processing the first query in the first group comprises:
    transmitting a message to a coordinator node of the first group indicating that the coordinator node is to preempt the first computing node.

15. A system comprising:
    a first one or more electronic devices in a provider network to implement one or more services, the one or more services to store data; and
    a second one or more electronic devices in the provider network to implement a query execution service, the query execution service including instructions that upon execution cause the query execution service to:
    determine based on one or more characteristics of a multi-tenant resource pool to preempt one or more computing nodes from one or more of a plurality of groups in the provider network;

identify a first computing node from a first group of the plurality of groups as a candidate to be preempted, the first group of computing nodes executing tasks as part of processing a first query, wherein the tasks include performing operations using at least some of the data stored by the one or more services, and wherein the first query comprises a Structured Query Language (SQL) query;

cause the first computing node to be removed from further executing tasks as part of processing the first query in the first group while another one or more computing nodes of the first group continue to execute tasks as part of processing the first query; and add the first computing node to a second group to execute other tasks as part of processing a second query, wherein the identification of the first computing node as the candidate or the causation of the first computing node to be removed occurs based on a determination of whether the first computing node is performing stateful or stateless operations as part of processing the first query.

16. The system of claim 15, wherein the instructions upon execution further cause the query execution service to:
determine that an amount of available computing resources in the resource pool of the provider network that is available is less than a threshold value.

17. The system of claim 15, wherein the instructions upon execution further cause the query execution service to identify the first computing node as a candidate to be preempted based on at least one of:
 a resource capacity associated with the first group or the first computing node;
 a characteristic of the first query; or
 a computing capability of the first computing node.

18. The system of claim 15, wherein the instructions upon execution further cause the query execution service to:
 stop adding additional tasks to a task queue that is utilized by the first computing node; and
 determine that the first computing node has completed execution of all tasks in the task queue.

19. The system of claim 18, wherein the instructions upon execution further cause the query execution service to:
 cause the first computing node to be made available in the resource pool in the provider network.

20. The system of claim 15, wherein the instructions upon execution further cause the query execution service to:
 determine that the first computing node is executing stateful operations as part of processing the first query;
 cause a state generated by the first computing node as part of processing the first query to be transferred to a second computing node in the first group; and
 cause the second computing node to perform different operations based on the state.

* * * * *